S. W. BARBER.

Sled Brake.

No. 88,832.

Patented April 13, 1869.

Witnesses

Inventor
Sam. W. Barber
per Attorneys

SAMUEL W. BARBER, OF HEATH, MASSACHUSETTS.

*Letters Patent No. 88,832, dated April 13, 1869.*

IMPROVED SLED-BRAKE.

The Schedule referred to in these Letters Patent and making part of the same.

*To all whom it may concern:*

Be it known that I, SAMUEL W. BARBER, of Heath, in the county of Franklin, and State of Massachusetts, have invented a new and improved Sled-Brake; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved self-applying sled-brake, which shall be so constructed and arranged as to be applied by the action of the team in holding back, and which shall steady the load at the same time that it releases the horses, and It consists in the construction and combination of the various parts, as hereinafter more fully described.

A are the runners;

B, the knees;

C, the beams; and

D, the raves of the sled, about the construction of which parts there is nothing new.

E is the roller, with which the tongue F is connected, and the ends of which are pivoted to the runners A, or frame of the sled, in the ordinary manner.

Figure 1:
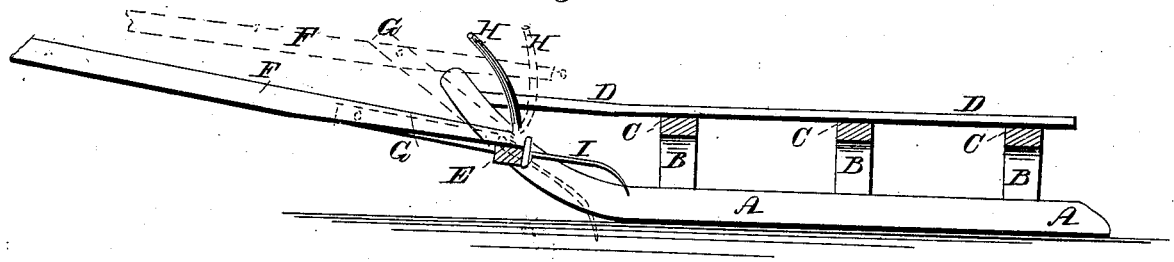
Figure 1 is a vertical longitudinal section of my improved sled, taken through the line $x\ x$, fig. 2.
Figure 2:
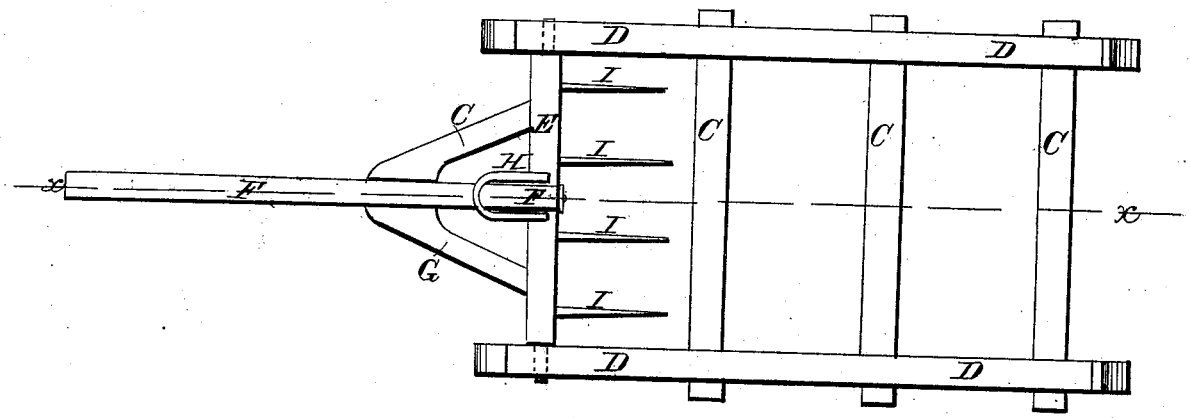
Figure 2 is a top view of the same.

G are the hounds, which are securely attached to the roller E, and to which the tongue F is pivoted by a bolt, as shown in figs. 1 and 2.

The rear end of the tongue F rests in a notch, formed in the upper side of the roller E.

H is a guide-loop, attached to the roller E, and extending upward and forward, as shown in fig. 1, so as to guide the up-and-down movement of the rear end of the tongue, and keep it always in the same vertical plane.

To the rear side of the roller E are attached rearwardly-extending arms, or prongs I, the rear ends of which are bent, or curved downward, as shown in fig. 1.

By this construction and arrangement of parts, when the sled presses forward against the horses, in going down hill, the action of holding back will cause the rear end of the tongue F to rise, forcing the hounds G upward, and the arms, or prongs I downward against the roadway, with a force directly proportioned to the forward pressure of the load, as shown in red, in fig. 1.

The rear end of the tongue F may be provided with a hook, or other catch, by means of which it may be connected with the roller E when it is desired that the brake should not act.

Having thus described my invention,

I claim as new, and desire to secure by Letters Patent—

1. The combination and arrangement of the roller E, tongue F, hounds G, guide-loop H, and arms, or prongs I, with each other, and with the runners, or frame of the sled, substantially as herein shown and described, and for the purpose set forth.

2. Pivoting the tongue to the forward parts of the hounds, and leaving its rear end free to move upward, substantially as herein shown and described, and for the purpose set forth.

SAMUEL W. BARBER.

Witnesses:
WM. H. BOLTON,
WM. F. MARSH.